Figure 1:
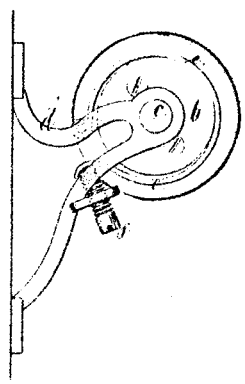

R. E. Hitchcock,
Curtain Fixture.
No. 98,261. Patented Dec. 28, 1869.

Witnesses,
Chas. H. Smith,
Geo. D. Walker.

Rufus E. Hitchcock
per L. W. Serrell

United States Patent Office.

RUFUS E. HITCHCOCK, OF WATERBURY, CONNECTICUT.

Letters Patent No. 98,261, dated December 28, 1869.

IMPROVED CURTAIN-FIXTURE.

The Schedule referred to in these Letters Patent and making part of the same.

*To all whom it may concern:*

Be it known that I, RUFUS E. HITCHCOCK, of Waterbury, in the county of New Haven, and State of Connecticut, have invented and made a new and useful Improvement in Curtain-Fixtures; and I do hereby declare the following to be a correct description thereof.

The object of this invention is to prevent a window-curtain or shade unrolling or running down in consequence of the weight of the said curtain. as it hangs from a roller.

A friction-strap has heretofore been employed upon the grooved pulley of the curtain-roller, to keep the cord upon said pulley, and to apply a friction to prevent the roller revolving by the weight of the curtain. In this case, the cord had to be threaded through beneath the friction-strap, or that strap removed when the cord was to be put upon the pulley.

My invention consists in a cylindrical roller-end, combined with a friction-strap upon the bracket, adjustable by a screw, so as to apply the desired friction at one end of the curtain-roller. By this device, the detaining friction that prevents the curtain unwinding, is entirely independent of device for revolving the roller, and raising or lowering the curtain, and can be applied with most of the curtain-fixtures now in use.

In the drawing—

Figure 2:
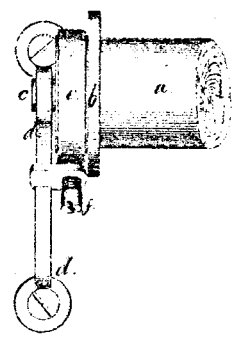

Figure 1 is an end view, showing the friction-strap, roller-end, and bracket, and Figure 2 is a view, sidewise, of the end of the roller, and the parts applied thereto.

The roller-end $b$, of suitable material, is to be cylindrical in shape, and its centre is the pivot $c$, upon which the roller revolves in a bracket, $d$, of any usual or desired construction.

A portion of the wooden curtain-roller is shown at $a$.

The friction-strap $e$ is affixed at one end to the bracket $d$, and passes around the cylindrical periphery of the roller-end $b$, and the opposite end is adjustable, so as to apply the desired friction to the curtain-roller for the purposes aforesaid.

I have represented the screw $f$ as a convenient means for adjusting the friction of this strap $e$.

I claim, as my invention—

The cylindrical roller-end $b$, in combination with the adjustable friction-strap $e$ and bracket $d$, as specified, so as to apply a variable friction to the curtain-roller, independent of the device for rotating the roller, as set forth.

Signed by me, this 22d day of September, A. D. 1869.

RUFUS E. HITCHCOCK.

Witnesses:
P. G. PORTER,
J. W. WEBSTER.